(12) United States Patent
Nakajima

(10) Patent No.: US 9,505,080 B2
(45) Date of Patent: Nov. 29, 2016

(54) ROTARY WORK DEVICE

(71) Applicant: Kyokutoh Co., Ltd., Aichi (JP)

(72) Inventor: Kotaro Nakajima, Aichi (JP)

(73) Assignee: Kyokutoh Co., Ltd., Aichi (JP)

( * ) Notice: Subject to any disclaimer, the term of this patent is extended or adjusted under 35 U.S.C. 154(b) by 267 days.

(21) Appl. No.: 14/532,310

(22) Filed: Nov. 4, 2014

(65) Prior Publication Data

US 2015/0217397 A1    Aug. 6, 2015

Related U.S. Application Data

(63) Continuation of application No. PCT/JP2014/000644, filed on Feb. 6, 2014.

(51) Int. Cl.
*B23K 11/36* (2006.01)
*B23K 11/11* (2006.01)
*B23K 11/30* (2006.01)
*B23B 5/16* (2006.01)
(Continued)

(52) U.S. Cl.
CPC ........... *B23K 11/3063* (2013.01); *B23B 5/166* (2013.01); *B23K 11/115* (2013.01); *B23K 11/30* (2013.01); *B23K 11/3072* (2013.01); *B23K 11/31* (2013.01); *B23Q 3/15526* (2013.01); *Y10T 29/5168* (2015.01); *Y10T 409/304256* (2015.01); *Y10T 483/115* (2015.01); *Y10T 483/17* (2015.01); *Y10T 483/1882* (2015.01)

(58) Field of Classification Search
CPC .......... B23K 11/3063; B23K 11/3072; B23B 5/166; Y10T 483/17; Y10T 409/304144; Y10T 409/3042; Y10T 409/304256; B23Q 3/155–3/15793

USPC .............. 219/86.8; 483/16, 67; 409/138–140
See application file for complete search history.

(56) References Cited

U.S. PATENT DOCUMENTS 4,935,595 A * 6/1990 Fuse .................. B23K 11/3072
219/86.25
5,387,774 A 2/1995 Boyer et al.
(Continued)

FOREIGN PATENT DOCUMENTS

CN 201997927 U 10/2011
CN 103170720 A 6/2013
(Continued)

OTHER PUBLICATIONS

English Translation of International Search Report for corresponding International Application No. PCT/JP2014/000644 mailed Mar. 25, 2014 (previously submitted on Nov. 4, 2014).
(Continued)

*Primary Examiner* — Erica E Cadugan
(74) *Attorney, Agent, or Firm* — Renner, Otto, Boisselle & Sklar, LLP

(57) ABSTRACT

A rotary work device includes: a first output gear into which a holder is fitted; a second output gear into which a cutter is fitted; a second intermediate gear meshing with both the output gears; and a servomotor rotating the second intermediate gear. A control panel includes a memory storing a first rotational speed and a second rotational speed that is higher than the first rotational speed. When an electrode detachment operation is performed, both the output gears are rotated at the first rotational speed, and when an electrode cutting operation is performed, both the output gears are rotated at the second rotational speed.

5 Claims, 6 Drawing Sheets

(51) Int. Cl.
   *B23C 3/00*     (2006.01)
   *B23Q 3/155*    (2006.01)
   *B23K 11/31*    (2006.01)

(56) References Cited

U.S. PATENT DOCUMENTS

| | | | | |
|---|---|---|---|---|
| 5,725,340 | A * | 3/1998 | Nakajima | B23B 5/166 |
| | | | | 407/42 |
| 5,734,141 | A * | 3/1998 | Voilmy | B23K 11/3072 |
| | | | | 219/86.25 |
| 6,499,921 | B1 | 12/2002 | Frasher | |
| 6,518,537 | B1 | 2/2003 | Tezawa | |
| 7,204,792 | B2 * | 4/2007 | Hagihara | B23K 9/32 |
| | | | | 483/13 |
| 9,321,124 | B2 * | 4/2016 | Nakajima | B23K 11/115 |
| 2004/0149692 | A1 | 8/2004 | Masanori | |
| 2015/0258625 | A1 * | 9/2015 | Yao | B23K 11/3072 |
| | | | | 451/70 |

FOREIGN PATENT DOCUMENTS

| | | | |
|---|---|---|---|
| CN | 104259642 A | * | 1/2015 |
| DE | 102012005259 A1 | * | 9/2013 |
| EP | 1 287 938 A1 | | 3/2003 |
| EP | 2072170 A1 | * | 6/2009 |
| EP | 2327500 A1 | * | 6/2011 |
| FR | 2691092 A1 | * | 11/1993 |
| JP | 2000-158150 | | 6/2000 |
| JP | 2003-103378 | | 4/2003 |
| JP | 3650928 B2 | | 3/2005 |
| JP | 2005-205431 | | 8/2005 |

OTHER PUBLICATIONS

Extended European Search Report dated Aug. 20, 2015 for corresponding European Application No. 14796652.7.
International Search Report for corresponding International Application No. PCT/JP2014/000644 mailed Mar. 25, 2014.
Form PCT/ISA/237 for corresponding International Application No. PCT/JP2014/000644 dated Mar. 25, 2014.

* cited by examiner

ROTARY WORK DEVICE

CROSS-REFERENCE TO RELATED APPLICATION

This is a continuation of International Application No. PCT/JP2014/000644 filed on Feb. 6, 2014. The entire disclosure of the application is incorporated by reference herein.

BACKGROUND

The present invention relates to rotary work devices that each rotate to cut the distal end surface of a spot welding electrode for use in, for example, an automobile production line away or to detach the electrode from the distal end of a shank.

Spot welding has been conventionally used in an automobile production line. In spot welding, a copper electrode fitted to the distal end of a shank of a spot welding gun is pressed against a steel sheet, and the steel sheet is energized, and is thus resistance-heated to perform welding.

Repetitions of a welding operation cause an oxide film to be deposited on the distal end surface of the electrode, and when welding is performed with the oxide film deposited, the quality of a weld is reduced. Thus, the distal end surface of the electrode needs to be cut away regularly to remove the oxide film. Cutting the distal end surface of the electrode away a plurality of times reduces the length of the electrode. Thus, the electrode need be detached from the shank so as to be replaced with a new electrode.

To address the needs, a rotary work device for spot welding is typically used in an automobile production line to cut the distal end surface of an electrode away and detach the electrode from a shank. A rotary work device described in, for example, Japanese Patent No. 3650928 includes an annular first rotator into which a holder capable of holding an electrode is fitted, an annular second rotator into which a cutter capable of cutting the distal end surface of the electrode away is fitted, and a single drive motor having a vertically extending rotation axis. The first rotator has a periphery including a plurality of uniformly spaced teeth. The second rotator also has a periphery including a plurality of uniformly spaced teeth. The first rotator and the drive motor are coupled together through a plurality of meshed gears, and the second rotator and the drive motor are also coupled together through a plurality of meshed gears. If, while the electrode fitted to the distal end of a shank is held by a holder, the drive motor is rotated, the first rotator allows the electrode to rotate about the central axis of the electrode together with the holder and to be detached from the distal end of the shank. If, while the drive motor is rotated, the distal end surface of the electrode fitted to the distal end of the shank is brought into contact with the cutter, the second rotator allows the cutter to rotate about the central axis of the electrode and to cut the distal end surface of the electrode away.

A suitable rotational speed of the cutter for an electrode cutting operation is significantly different from that of the holder for an electrode detachment operation. For this reason, in Japanese Patent No. 3650928, the outside diameters of the first and second rotators are designed to be significantly different from each other, and the drive motor is rotated at a constant speed. This allows the rotational speed of the first rotator to be different from that of the second rotator.

SUMMARY

In the rotary work device of Japanese Patent No. 3650928, both the rotators have different sizes, and while the first rotator rotates at the suitable rotational speed for the electrode detachment operation, the second rotator rotates at the suitable rotational speed for the electrode cutting operation. Thus, if the cutter is fitted to the first rotator, or the holder is fitted to the second rotator, the electrode detachment operation and the electrode cutting operation cannot be appropriately performed. Thus, if, in the case of disposing such rotary work devices as described above symmetrically with respect to a production line, an attempt is made to satisfy a demand for exchanging the positions of the holder and the cutter of one of the rotary work devices, the need for extensively modifying the internal structure of the one of the devices arises, resulting in an increase in cost. Alternatively, depending on the configuration of the production line, a holder or a cutter may be desired to be fitted to each of the first and second rotators. Furthermore, since, in Japanese Patent No. 3650928, the outside diameters of the first and second rotators vary, and many gears each mesh with a corresponding one or corresponding ones of the gears between the drive motor and each rotator in a complicated manner, component costs increase, and the entire device is upsized.

It is therefore an object of the present invention to provide a low-cost, compact rotary work device with great versatility.

In order to achieve the object, in the present invention, two rotators have the same outside diameter (pitch diameter), and are rotated at the same time by a single intermediate gear, and the rotational speeds of both the rotators are controlled by a servomotor.

Specifically, the present invention is directed to a rotary work device holding an electrode fitted to a distal end of a shank of a spot welding gun with a holder and simultaneously rotating the holder about a central axis of the electrode to perform an electrode detachment operation in which the electrode is detached from the distal end of the shank, or bringing a cutter into contact with a distal end surface of the electrode fitted to the distal end of the shank and rotating the cutter about the central axis of the electrode to perform an electrode cutting operation in which the distal end surface of the electrode is cut away, and the following measures are taken.

Specifically, a first aspect of the invention is directed to a rotary work device holding an electrode fitted to a distal end of a shank of a spot welding gun with a holder and simultaneously rotating the holder about a central axis of the electrode to perform an electrode detachment operation in which the electrode is detached from the distal end of the shank, or bringing a cutter into contact with a distal end surface of the electrode fitted to the distal end of the shank and rotating the cutter about the central axis of the electrode to perform an electrode cutting operation in which the distal end surface of the electrode is cut away. The device includes: a pair of rotators into each of which the holder or the cutter is fitted, and which each have an outer periphery including a plurality of annularly arranged teeth, and are arranged radially in parallel such that rotation axes of the rotators face in an identical direction; an actuator including an intermediate gear meshing with some of the teeth of each rotator, and a servomotor rotating the intermediate gear; and a controller including a memory that is connected to the servomotor and stores a first rotational speed and a different second rotational speed higher than the first rotational speed.

When the electrode detachment operation is performed using at least one of the rotators, the controller outputs a detachment start signal to the servomotor to rotate both of the rotators at the first rotational speed, and when the electrode cutting operation is performed using at least the other one of the rotators, the controller outputs a cutting start signal to the servomotor to rotate both of the rotators at the second rotational speed.

According to a second aspect of the invention, in the first aspect of the invention, an electrode container may be provided radially outward from one of the rotators, and may be capable of containing a plurality of unused electrodes such that a central axis of each electrode faces in a direction in which the rotation axis of the one of the rotators faces, and a location at which one of the electrodes contained in the electrode container is ejected from the electrode container may be in a straight line connecting the rotation centers of the rotators.

According to a third aspect of the invention, in the first or second aspect of the invention, the servomotor may have a rotation axis extending in a direction crossing the rotation axes of the rotators.

According to a fourth aspect of the invention, in any one of the first through third aspects of the invention, the rotation axis of the servomotor may be above the rotators.

According to a fifth aspect of the invention, in any one of the first through fourth aspects of the invention, the holder may include an annular body that is rotatable under a condition where a rotation axis of the annular body corresponds to the rotation axis of at least one of the rotators, and a plurality of pressing members uniformly spaced about the rotation axis of the annular body and each supported by a spindle extending in a direction identical to a direction of extension of the rotation axis of the annular body to be rotatable toward the rotation axis of the annular body. The pressing members may each have a projection projecting away from the rotation axis of the annular body. An inner circumferential surface of the at least one of the rotators may have a plurality of recesses into each of which a corresponding one of the projections is loosely fitted. Under a condition where the electrode is placed among the pressing members such that the central axis of the electrode corresponds to the rotation axis of the annular body, the at least one of the rotators may be rotated about the rotation axis of the annular body in one of directions of rotation of the at least one of the rotators. The rotation of the at least one of the rotators relative to the holder may allow an inner surface of each recess to press a corresponding one of the projections. The pressing members may be thus rotated toward the rotation axis of the at least one of the rotators, and may press an outer circumferential surface of the electrode to hold the electrode. The electrode may be rotated together with the holder by further rotating the at least one of the rotators about the rotation axis of the at least one of the rotators in the one of directions of rotation of the at least one of the rotators, and may be detached from the distal end of the shank.

In the first aspect of the invention, the rotational speeds of the rotators can be optionally changed. This enables appropriate operations when the holder and the cutter are each fitted into either of the rotators. Thus, for example, in the case of disposing rotary work devices symmetrically with respect to a production line, the rotary work devices can be made symmetric only by exchanging the positions of the holder and the cutter in the rotators of one of the rotary work devices, thereby preventing an increase in cost. Furthermore, a holder can be fitted into each rotator, or a cutter can be fitted into each rotator, thereby providing great versatility.

Moreover, since the single intermediate gear between the rotators rotates the rotators at the same time, the number of gears can be less than that of Japanese Patent No. 3650928, and a low-cost, compact rotary work device can be obtained.

In the second aspect of the invention, a region of the device where an electrode is partially cut away, a region thereof where an electrode is detached from the shank, and a region thereof where an electrode is fitted to the shank are aligned. This alignment can simplify operation of, for example, a robot or an automatic machine moving an electrode in the production line to reduce the takt time.

In the third aspect of the invention, the servomotor extends in a direction crossing the rotation axes of the rotators. Thus, when the operation in which the electrode is partially cut away and the operation in which the electrode is detached from the shank are performed, a portion of the robot or an automatic machine that brings the electrode closer to the rotators along the respective rotation axes is less likely to be in contact with the device.

In the fourth aspect of the invention, when the electrode is to be detached from the distal end of the shank, cooling water dropping from the shank is less likely to reach the inside of the servomotor even if the cooling water enters the device. This can ensure that even when the operation in which the electrode is detached from the shank is repeated, a failure of the servomotor is prevented.

In the fifth aspect of the invention, the rotation of at least one of the rotators in the electrode detachment operation can be utilized to hold a target electrode for being detached. This eliminates the need for preparing a driving source for rotating the at least one of the rotators separately from the servomotor to hold the electrode. A simple facility can be provided, and a low-cost, compact rotary work device can be obtained.

DETAILED DESCRIPTION

An embodiment of the present invention will now be described in detail with reference to the drawings. The following embodiment is merely a preferred example.

Figure 1:
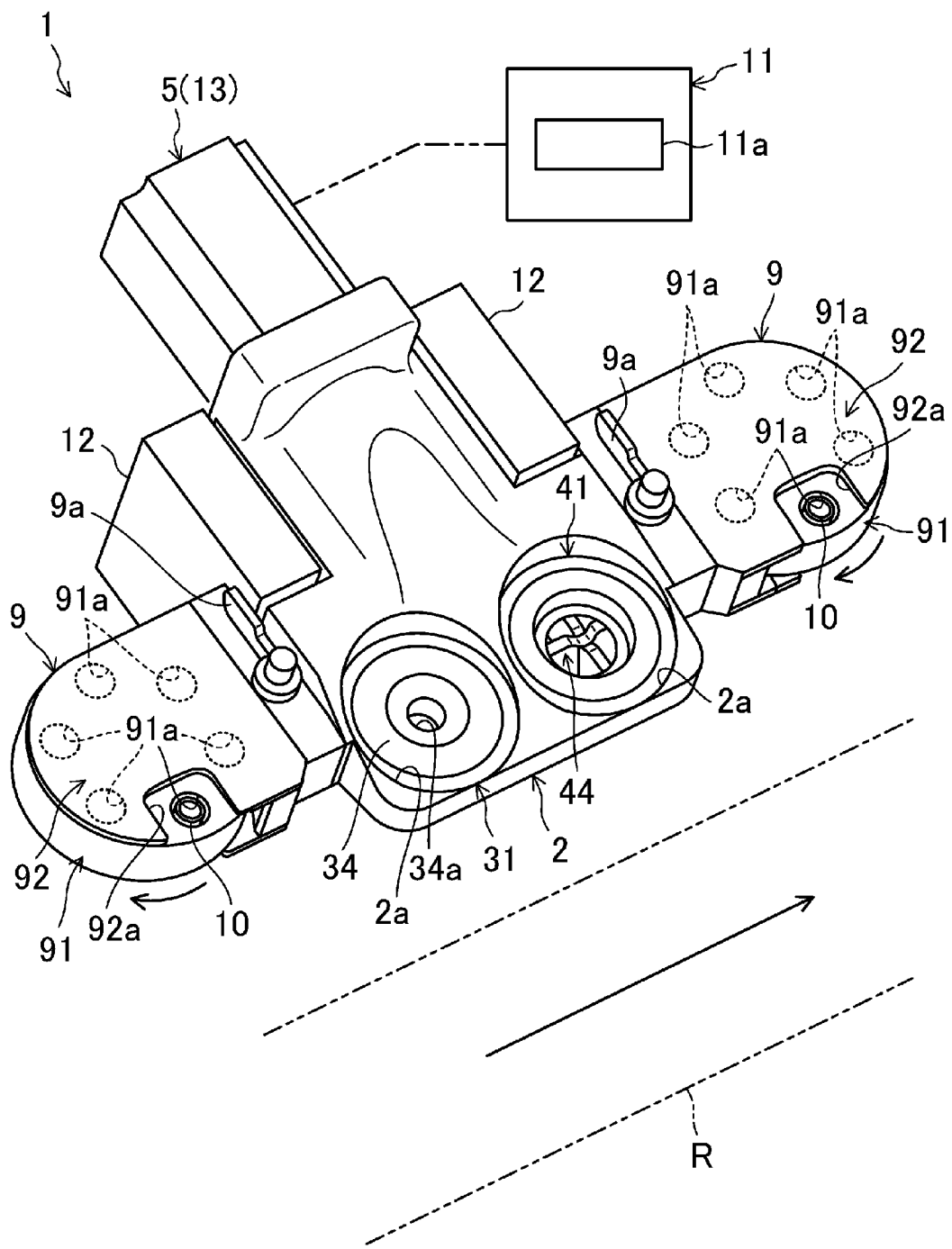
FIG. 1 is a perspective view of a rotary work device according to an embodiment of the present invention.

FIG. 1 illustrates a rotary work device 1 according to the embodiment of the present invention. The rotary work device 1 is placed laterally outward from a transfer passage R of an automobile production line to perform an electrode detachment operation and an electrode cutting operation (see FIGS. 4 and 5). In the electrode detachment operation, an electrode 10 is detached from the distal end of a shank S1 of a spot welding gun G grasped by a welding robot (not shown), and in the electrode cutting operation, the distal end of the electrode 10 on which an oxide film is deposited due to repetitions of welding is cut away.

A casing 2 that is generally rectangular when viewed in plan is provided in the middle section of the rotary work device 1.

Casing supporting mechanisms 12 are placed upstream and downstream of a portion of the casing 2 remote from the transfer passage R along a direction of transfer of components in the line, and each include an unshown coil spring, which absorbs impact caused when a vertical force acts on the casing 2.

Figure 3:
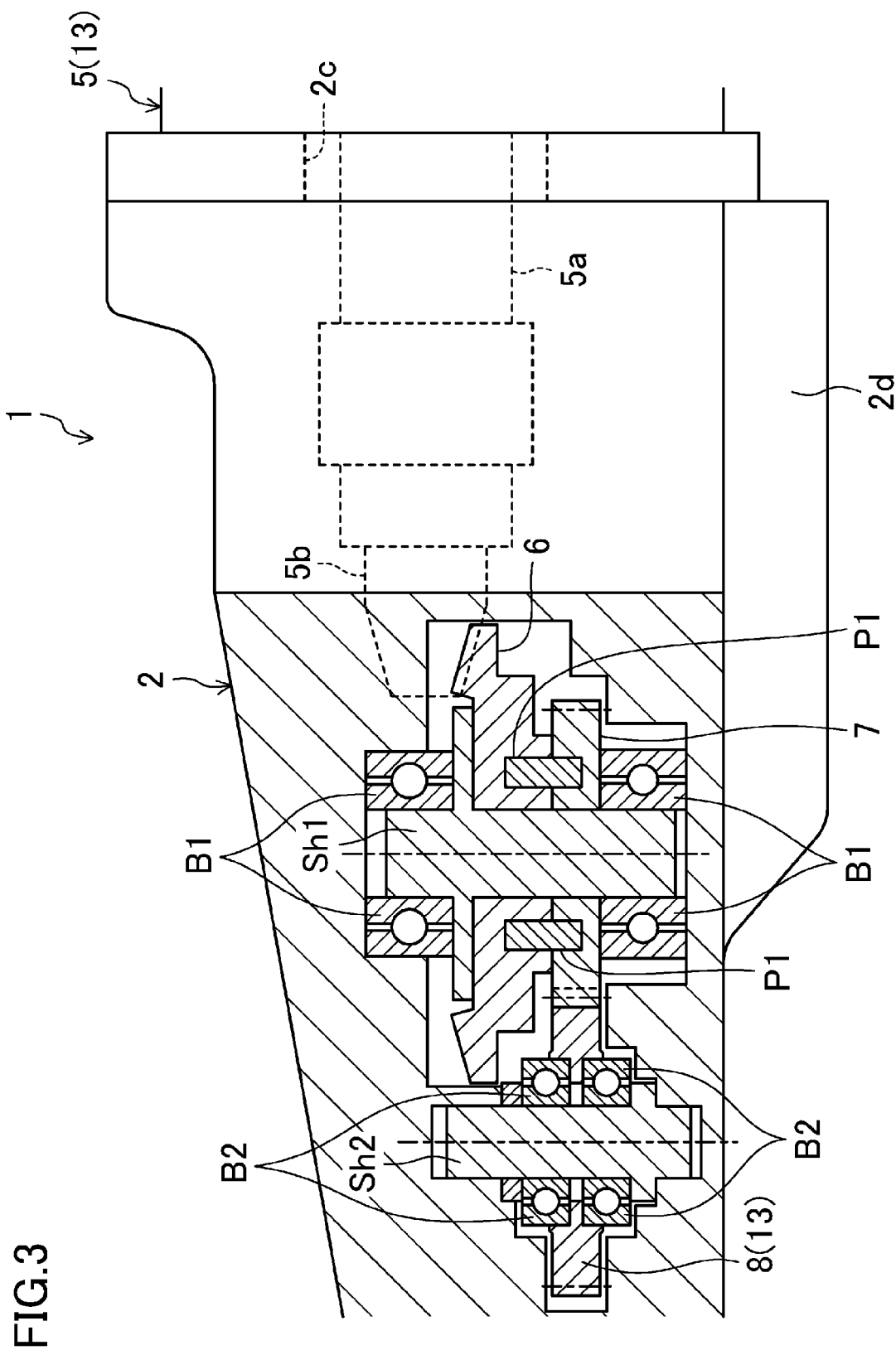
FIG. 3 is a cross-sectional view taken along the line A-A in FIG. 2.

The amount by which an upper surface of a middle portion of the casing 2 along the direction of transfer protrudes upwardly increases with increasing distance from the transfer passage R. As illustrated in FIG. 3, a plurality of stiffening ribs 2d are arranged in parallel along the direction of transfer on a lower surface of a portion of the casing 2 remote from the transfer passage R.

Figure 4:
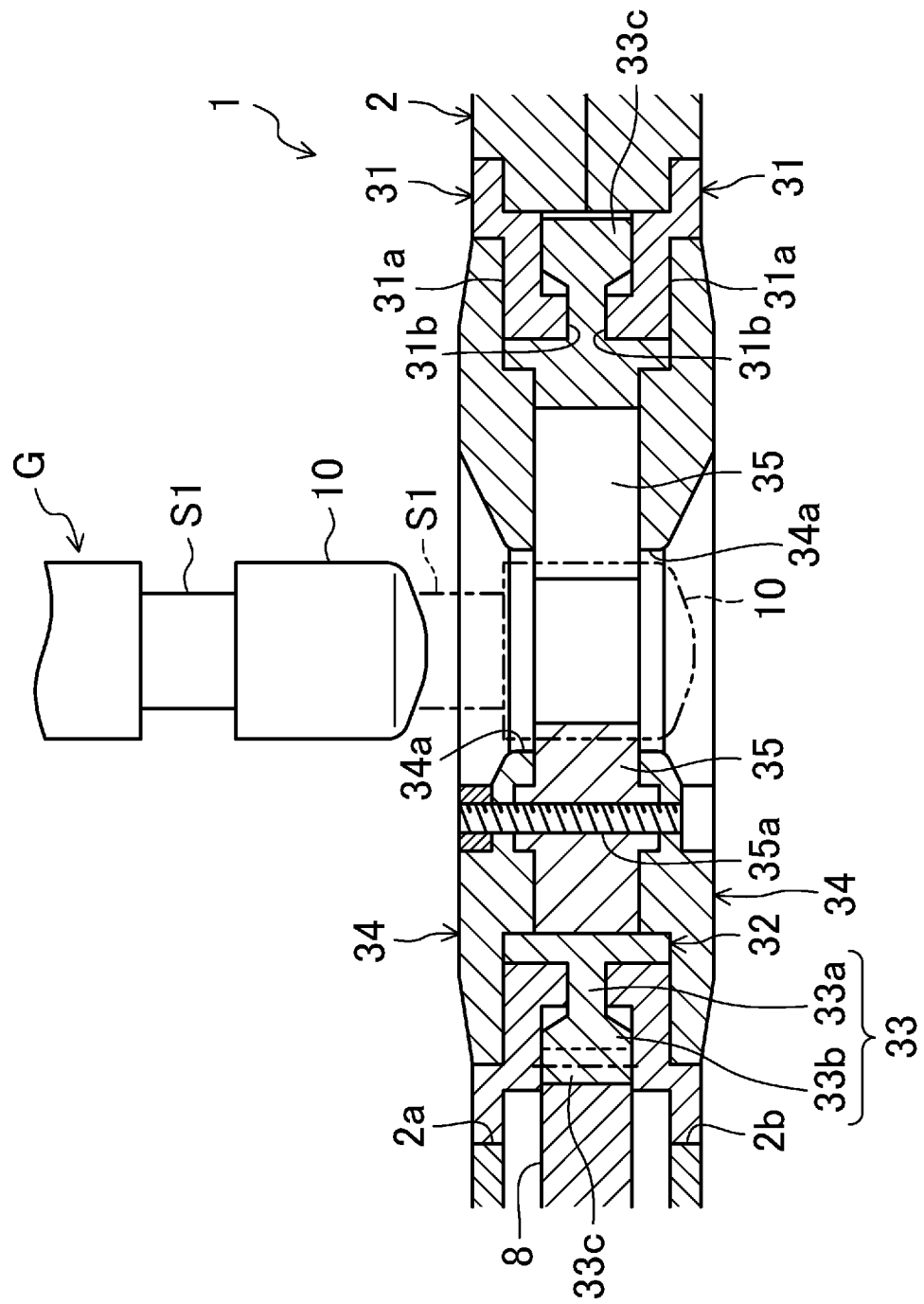
FIG. 4 is a cross-sectional view taken along the line B-B in FIG. 2.
Figure 5:
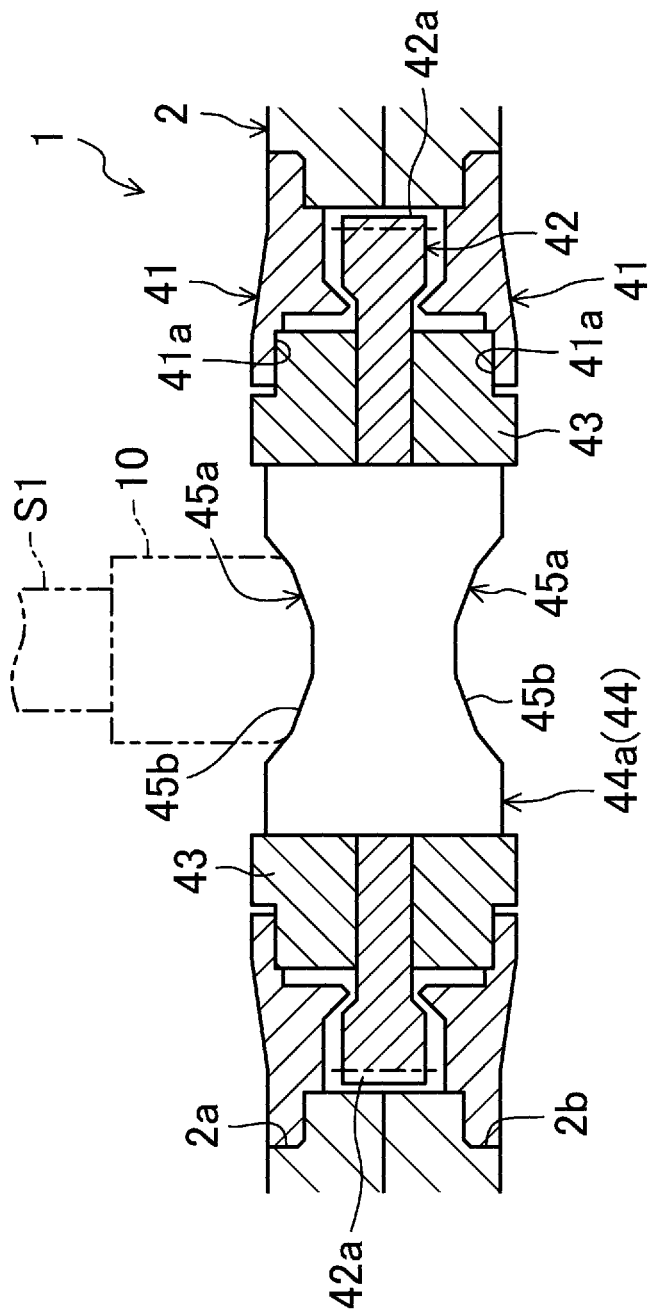
FIG. 5 is a cross-sectional view taken along the line C-C in FIG. 2.

As illustrated in FIGS. 4 and 5, a pair of upper through holes 2a forming an identical circular shape are formed in an upper surface of a portion of the casing 2 near the transfer passage R in parallel along the direction of transfer, and lower through holes 2b are formed in portions of a lower surface of the casing 2 corresponding to the upper through holes 2a to pass therethrough.

In contrast, as illustrated in FIG. 3, a servomotor 5 is fitted into an end portion of the casing 2 remote from the transfer passage R, and includes a rotation shaft 5a extending in a horizontal direction crossing the direction of transfer.

The rotation shaft 5a of the servomotor 5 passes through a communication hole 2c formed in the end portion of the casing 2 remote from the transfer passage R and communicating with the inside of the casing 2, faces the inside of the casing 2, and has a distal end to which an input gear 5b formed in the shape of a generally circular truncated cone is fitted.

A portion of the casing 2 remote from the transfer passage R includes a vertically extending first rotation shaft Sh1 rotatably supported by the casing 2 through bearings B1 each fitted onto a corresponding one of upper and lower end portions of the first rotation shaft Sh1.

A bevel gear 6 is fitted to the first rotation shaft Sh1 to rotate together with the first rotation shaft Sh1, and meshes with the input gear 5b from below.

A first intermediate gear 7 is fixed to the bevel gear 6 of the first rotation shaft Sh1 through a plurality of pins P1 below the bevel gear 6 such that the rotation axis of the first intermediate gear 7 corresponds to that of the bevel gear 6. The first intermediate gear 7 rotates together with the bevel gear 6.

A generally central portion of the casing 2 includes a vertically extending second rotation shaft Sh2 rotatably supported by the casing 2 through bearings B2 each fitted onto a corresponding one of upper and lower end portions of the second rotation shaft Sh2.

A second intermediate gear 8 is fitted to the second rotation shaft Sh2 to rotate together with the second rotation shaft Sh2, and meshes with the first intermediate gear 7. The second intermediate gear 8 and the servomotor 5 form an actuator 13 of the present invention.

Ring-shaped first bushings 31 are placed in a peripheral portion of one of the upper through holes 2a located upstream along the direction of transfer and a peripheral portion of one of the lower through holes 2b corresponding to the one of the upper through holes 2a as illustrated in FIG. 4. While a front surface of a portion of each first bushing 31 near the inner circumference thereof has an annular cutout 31a, a back surface of the portion of the first bushing 31 near the inner circumference thereof has an annular protrusion 31b.

A ring-shaped first output gear 32 (rotator) that is rotatable about the rotation axis C1 facing upward or downward is provided between both the first bushings 31, and is located below the rotation shaft 5a of the servomotor 5.

Specifically, the rotation shaft 5a of the servomotor 5 is located above the first output gear 32, and the servomotor 5 is provided with its rotation shaft 5a extending in a direction that crosses the rotation axis C1 of the first output gear 32.

An outer circumferential surface of the first output gear 32 has an annular protrusion 33 protruding laterally outward and having a generally T-shaped cross section.

The annular protrusion 33 includes an annular thin base portion 33a protruding laterally outward and extending radially outward of the rotation axis of the first output gear 32, and an extending portion 33b vertically extending from the outer periphery of the base portion 33a. The base portion 33a is located between the annular protrusions 31b of both the first bushings 31.

An outer circumferential surface of the extending portion 33b includes a plurality of first teeth 33c, which are uniformly spaced in parallel about the rotation axis C1 to form an annular shape.

Figure 2:
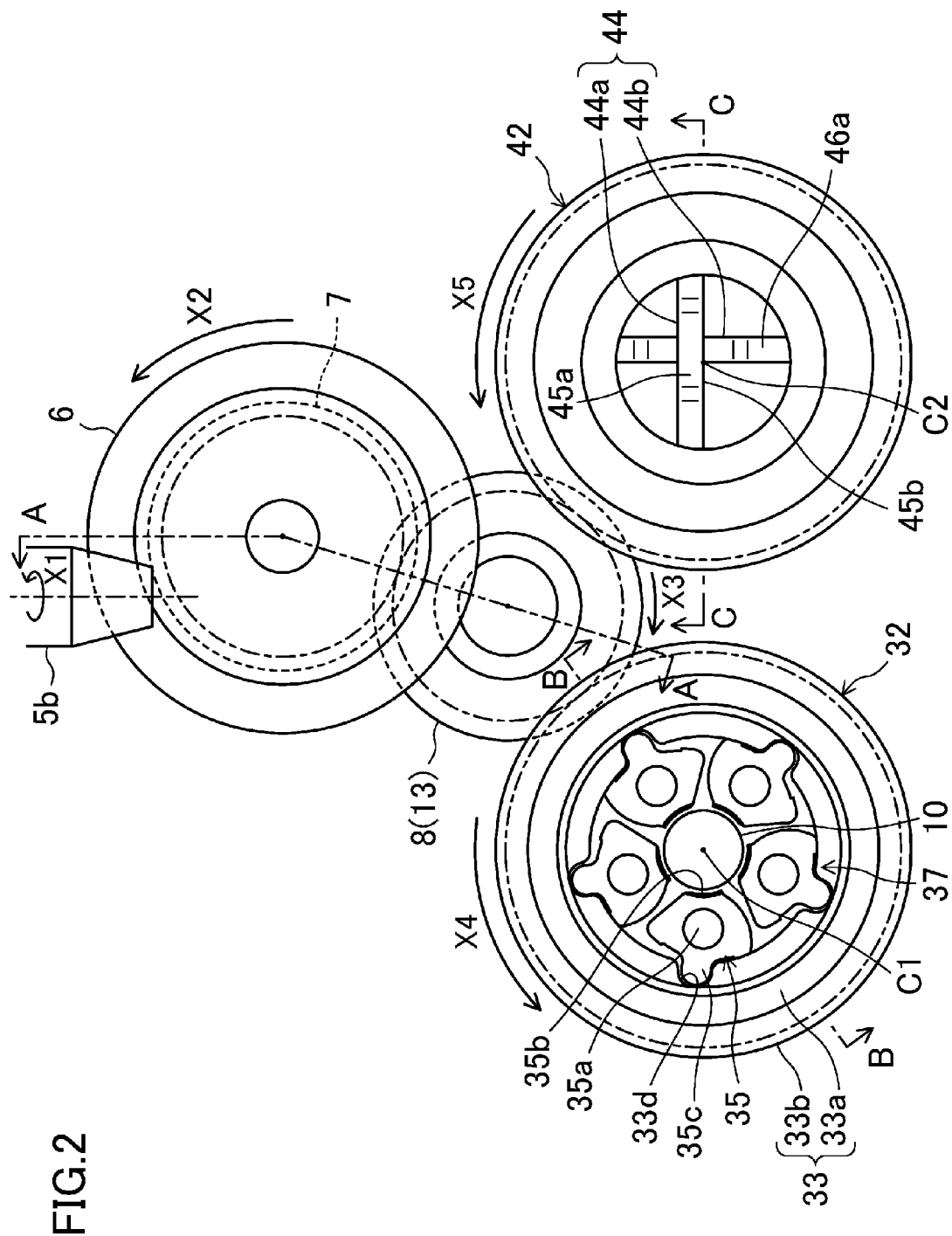
FIG. 2 is a plan view illustrating how gears within the device mesh with one another.

Furthermore, as illustrated in FIG. 2, an inner surface of the first output gear 32 is recessed radially outward to form five grooves 33d (recesses) extending in a vertical direction. The five grooves 33d are uniformly spaced about the rotation axis C1.

A generally disc-like cover member 34 (an annular body) that is rotatable about the rotation axis C1 is fitted into the cutout 31a of each first bushing 31 such that the rotation axis of the cover member 34 corresponds to the rotation axis C1 of the first output gear 32. An electrode insertion hole 34a through which the electrode 10 is to be inserted into the first output gear 32 is formed in a central portion of each cover member 34 to pass therethrough.

Figure 6:
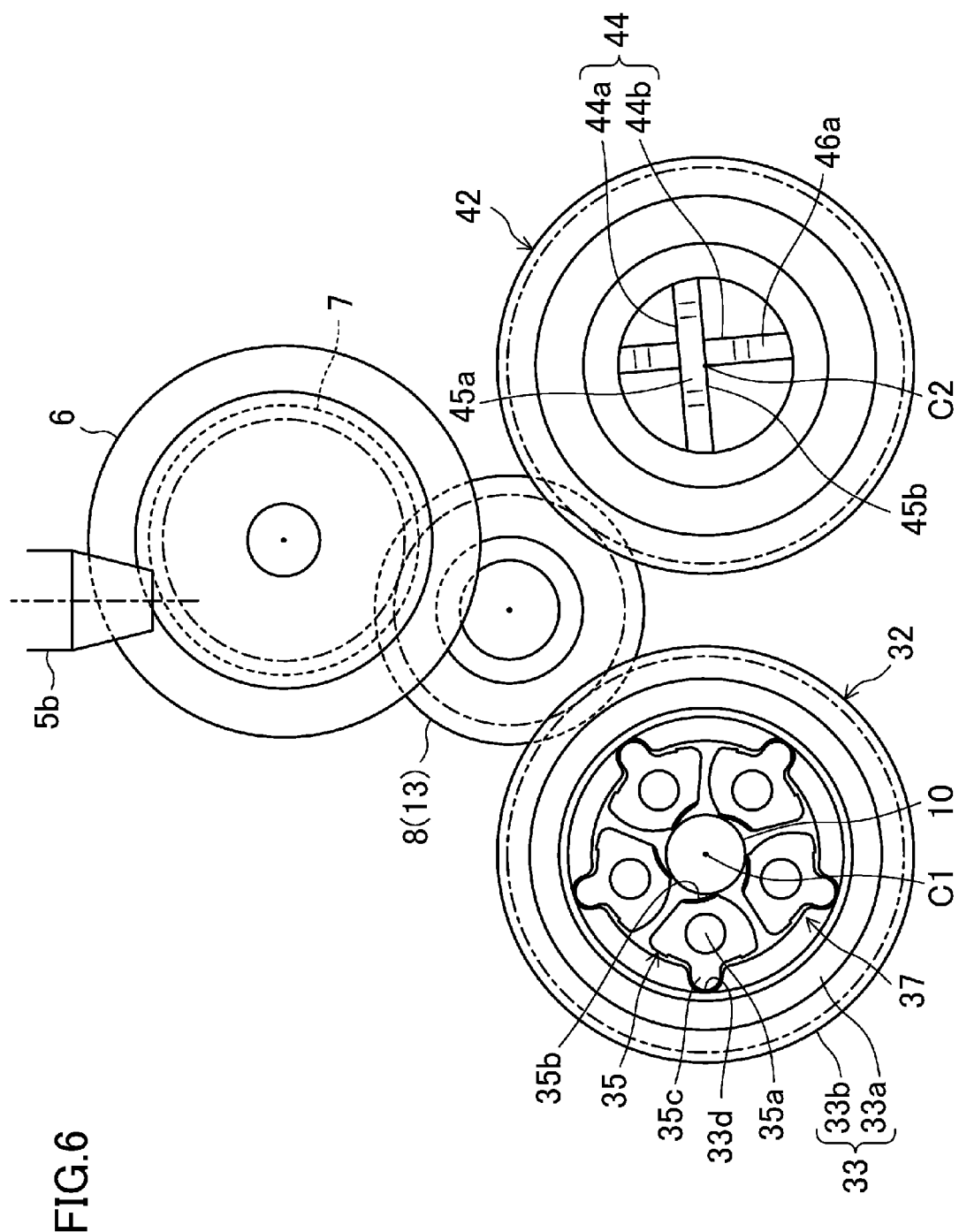
FIG. 6 illustrates the condition of the device immediately before both rotators are rotated from the condition illustrated in FIG. 2 to detach an electrode from the distal end of a shank.

As illustrated in FIGS. 2 and 6, five pressing members 35 that are generally fan-shaped when viewed in plan are uniformly spaced between both the cover members 34 and toward the inner circumference of the first output gear 32 about the rotation axis C1, and are positioned to correspond to the respective grooves 33d.

The pressing members 35 and the cover members 34 form a holder 37 of the present invention. The pressing members 35 are each pivotably supported by both the cover members 34 with a vertically extending screw 35a (spindle), and is rotatable toward the rotation axis C1 of the first output gear 32.

While a portion of each pressing member 35 near the rotation axis C1 has a curved surface 35b that is recessed outwardly along the radius of the first output gear 32, a portion of the pressing member 35 remote from the rotation axis C1 has a projection 35c loosely fitted into a corresponding one of the grooves 33d.

Ring-shaped second bushings 41 are placed in a peripheral portion of the upper through hole 2a located downstream along the direction of transfer and a peripheral portion of the lower through hole 2b corresponding to the upper through hole 2a as illustrated in FIG. 5. A back surface of a portion of each second bushing 41 near the inner circumference thereof has an annular cutout 41a.

A ring-shaped second output gear 42 (rotator) that is rotatable about the rotation axis C2 facing upward or downward is provided between both the second bushings 41, and has a pitch diameter equal to the pitch diameter of the first output gear 32.

In other words, the first and second output gears 32 and 42 have an identical outside diameter, and are arranged radially in parallel such that the rotation axis C1 of the first output gear 32 and the rotation axis C2 of the second output gear 42 face in the same direction.

A peripheral portion of the second output gear 42 extends in a vertical direction, and is thick. The outer periphery of the peripheral portion of the second output gear 42 includes second teeth 42a. The second teeth 42a are uniformly spaced in parallel about the rotation axis C2 to form an annular shape. The number of the second teeth 42a is equal to that of the first teeth 33c of the first output gear 32.

Annular cutter fixing members 43 are provided toward the inner circumference of the second output gear 42 to rotate together with the second output gear 42, and a cutter 44 is inserted into the cutter fixing members 43.

As illustrated in FIGS. 2 and 6, plate members 44a and 44b having substantially the same outer shape are assembled into the cutter 44 to be in the shape of a cross when viewed in plan. An intersection of the two plate members 44a and 44b is eccentric when viewed in plan such that the line of intersection of a side surface of one of the plate members 44a and 44b, i.e., the plate member 44a, and a side surface of the other one thereof, i.e., the plate member 44b, corresponds to the rotation axis C2 of the second output gear 42.

As illustrated in FIG. 5, while upper and lower surfaces of the plate member 44a have a pair of respective curved portions 45a that are recessed, upper and lower surfaces of the plate member 44b have a pair of respective curved portions 46a that are recessed. One longitudinal end portion of each curved portion 45a is provided with a cutting edge 45b. The cutting edge 45b extends along the radius of the electrode 10 to correspond to a distal end surface of the electrode 10.

The servomotor 5 is connected to a control panel 11 (controller), which outputs a detachment start signal, a holding release signal, and a cutting start signal to the servomotor 5.

The control panel 11 includes a memory 11a storing a low first rotational speed and a second rotational speed that is higher than the first rotational speed. When an electrode detachment operation is performed using the first output gear 32, the detachment start signal is output to the servomotor 5 to rotate the first and second output gears 32 and 42 at the first rotational speed. When an electrode cutting operation is performed using the second output gear 42, the cutting start signal is output to the servomotor 5 to rotate the first and second output gears 32 and 42 at the second rotational speed.

Specifically, when an electrode detachment operation is performed, the electrode 10 is placed among the pressing members 35 such that its central axis corresponds to the rotation axis C1 as illustrated in FIGS. 2 and 6, and in this state, the control panel 11 outputs the detachment start signal to the servomotor 5. This output allows the first output gear 32 to rotate about the rotation axis C1 in one of the directions of rotation of the first output gear 32 (an X4 direction in FIG. 2) at the first rotational speed through the input gear 5b, the bevel gear 6, the first intermediate gear 7, and the second intermediate gear 8 each meshing with a corresponding one or corresponding ones of the gears. This rotation of the first output gear 32 relative to the holder 37 allows the inner surface of each groove 33d to press a corresponding one of the projections 35c in the one of the directions of rotation.

This allows the pressing members 35 to rotate toward the rotation axis C1 and press the outer circumferential surface of the electrode 10, thereby holding the electrode 10. Subsequently, when the first output gear 32 further rotates about the rotation axis C1 in the one of the directions with the electrode 10 held by the pressing members 35, the first output gear 32 and the holder 37 rotate the electrode 10 about the central axis of the electrode 10 to detach the electrode 10 from the distal end of the shank S1.

The control panel 11 outputs the holding release signal to the servomotor 5 with the electrode 10 detached from the distal end of the shank S1. This output allows the first output gear 32 to rotate about the rotation axis C1 in the other one of the directions of rotation (a direction opposite to the X4 direction in FIG. 2) through the input gear 5b, the bevel gear 6, the first intermediate gear 7, and the second intermediate gear 8 each meshing with a corresponding one or corresponding ones of the gears. This rotation of the first output gear 32 relative to the holder 37 allows the inner surface of each groove 33d to press a corresponding one of the projections 35c in the other one of the directions of rotation. This allows the pressing members 35 to rotate away from the rotation axis C1 and release the held electrode 10 from the pressing members 35.

In contrast, when an electrode cutting operation is performed, the control panel 11 outputs the cutting start signal to the servomotor 5. This output allows the second output gear 42 to rotate about the rotation axis C2 in one of the directions of rotation of the second output gear 42 (an X5 direction in FIG. 2) together with the cutter 44 at the second rotational speed through the input gear 5b, the bevel gear 6, the first intermediate gear 7, and the second intermediate gear 8 each meshing with a corresponding one or corresponding ones of the gears, and in this state, the distal end surface of the electrode 10 is brought into contact with one of the curved portions 45a and 46a of the cutter 44. This allows one of the cutting edges 45b to cut the distal end surface of the electrode 10 away.

A pair of electrode containment boxes 9 (electrode containers) that can contain a plurality of unused electrodes 10 are provided laterally outward from a portion of the casing 2 near the transfer passage R along the direction of transfer (radially outward from the first and second output gears 32 and 42).

The electrode containment boxes 9 are each in the shape of a thick flat plate, are symmetric to each other with respect to the casing 2, and can be attached to or detached from the casing 2 with a lever 9a.

The electrode containment boxes 9 each include a disc 91 having a rotation axis facing upward or downward (facing in the direction in which the first and second output gears 32 and 42 face), and a cover 92 covering the disc 91.

A portion of each cover 92 near the transfer passage R has a cutout 92a which is generally rectangular when viewed in plan (at a location from which one of the electrodes is ejected). The cutout 92a is located on a straight line connecting the rotation centers of the first and second output gears 32 and 42.

A peripheral portion of each disc 91 has a plurality of electrode containment holes 91a opening upward and uniformly spaced around the rotation axis of the disc 91a. The electrode containment holes 91a each contain one of the unused electrodes 10 such that the central axes of the unused electrodes 10 face upward or downward and the unused electrodes 10 open upward.

When each disc 91 rotates about its rotation axis, the electrode containment holes 91a successively correspond to the cutout 92a, and the distal end of the shank S1 is inserted, from above, into the opening of one of the electrodes 10 contained in one of the electrode containment holes 91a corresponding to the cutout 92a. This insertion allows the one of the electrodes 10 to be fitted to the distal end of the shank S1 and to be then ejected from the one of the electrode containment holes 91a.

In the embodiment of the present invention, the holder 37 is fitted into the first output gear 32, and the cutter 44 is fitted into the second output gear 42. However, since the servomotor 5 allows the rotational speeds of the first and second output gears 32 and 42 to be freely determined, the first output gear 32 can be rotated at the first rotational speed with the cutter 44 fitted into the first output gear 32, or the second output gear 42 can be rotated at the second rotational speed with the holder 37 fitted into the second output gear 42. Alternatively, the holder 37 can be fitted into each of the first and second output gears 32 and 42, or to the contrary, the cutter 44 can be fitted into each of the first and second output gears 32 and 42.

The bevel gear 6 according to the embodiment of the present invention is a helical bevel gear, and the first intermediate gear 7, the second intermediate gear 8, the first output gear 32, and the second output gear 42 are helical gears. However, the gears can be replaced with usual bevel gears or spur gears.

While, in the embodiment of the present invention, the cutter 44 is in the shape of a cross when viewed in plan, the shape of the cutter 44 is not limited to the cross, and a cutter forming another shape may be fitted into the cutter fixing members 43.

Next, an operation in which an electrode 10 is detached from the distal end of the shank S1 will be described.

First, the electrode 10 fitted to the distal end of the shank S1 is inserted into the electrode insertion hole 34a of the cover member 34, and as illustrated in FIG. 2, the central axis of the electrode 10 is matched to the rotation axis of the first output gear 32.

Next, when a detachment start signal is output from the unshown welding robot to the control panel 11, the control panel 11 outputs a detachment start signal to the servomotor 5. This output allows the input gear 5b to rotate in an X1 direction, and allows the bevel gear 6 and the first intermediate gear 7 to rotate in an X2 direction as illustrated in FIG. 2. Furthermore, the rotation of the bevel gear 6 and the first intermediate gear 7 allows the second intermediate gear 8 to rotate in an X3 direction. This allows the first output gear 32 to rotate in the X4 direction.

In this case, the first output gear 32 rotates about the rotation axis C1 relative to the holder 37 in the X4 direction at the first rotational speed, and the inner surface of each groove 33d presses the projection 35c of a corresponding one of the pressing members 35 in the X4 direction.

The pressing members 35 each having the projection 35c pressed in the X4 direction rotate toward the rotation axis C1, and press the outer circumferential surface of the electrode 10, thereby allowing the pressing members 35 to hold the electrode 10.

Then, when the first output gear 32 further rotates in the X4 direction with the electrode 10 held by the pressing members 35, the first output gear 32 and the holder 37 rotate the electrode 10 about the central axis of the electrode 10, and the electrode 10 is detached from the shank S1.

Thereafter, when a holding release signal is output from the unshown welding robot to the control panel 11, the control panel 11 outputs a holding release signal to the servomotor 5. This output allows the first output gear 32 to rotate about the rotation axis C1 relative to the holder 37 in a direction opposite to the X4 direction, and the inner surface of each groove 33d presses the projection 35c of a corresponding one of the pressing members 35 in the direction opposite to the X4 direction.

Then, the pressing members 35 each having the projection 35c pressed in the direction opposite to the X4 direction rotate away from the rotation axis C1 and release the held electrode 10 from the pressing members 35.

Next, an operation in which an electrode 10 is fitted to the distal end of the shank S1 will be described.

When an electrode fitting start signal is fed from the control panel 11 to the unshown welding robot, the shank S1 from which an electrode 10 has been detached by the holder 37 moves upward, and then horizontally moves above the cutout 92a of one of the electrode containment boxes 9 in a straight line.

Subsequently, the shank S1 moves downward, and the distal end of the shank S1 is inserted into the opening of an unused electrode 10 contained in one of the electrode containment holes 91a corresponding to the cutout 92a from above. This insertion allows the electrode 10 to be fitted to the distal end of the shank S1.

Thereafter, the shank S1 is moved upward, and the electrode 10 is ejected from the one of the electrode containment holes 91a to complete the electrode fitting operation.

Next, an operation in which the distal end surface of the shank S1 is cut away will be described.

First, when a cutting start signal is output from the unshown welding robot to the control panel 11, the control panel 11 outputs a cutting start signal to the servomotor 5. This output allows the input gear 5b to rotate in the X1 direction, and allows the bevel gear 6 and the first intermediate gear 7 to rotate in the X2 direction as illustrated in FIG. 2. Furthermore, the rotation of the bevel gear 6 and the first intermediate gear 7 allows the second intermediate gear 8 to rotate in the X3 direction. This allows the second output gear 42 to rotate about the rotation axis C2 in the X5 direction.

Next, the electrode 10 fitted to the distal end of the shank S1 is moved above the cutter 44, and the central axis of the electrode 10 is matched to the rotation axis C2 of the second output gear 42.

Then, the electrode 10 is brought closer to the cutter 44 along the rotation axis C2 of the second output gear 42. This allows one of the cutting edges 45b of the rotating cutter 44 to be in contact with the distal end surface of the electrode 10, and the cutter 44 rotates about the central axis of the electrode 10 to cut the distal end surface of the electrode 10 away.

In view of the foregoing, according to the embodiment of the present invention, the rotational speeds of the first and second output gears 32 and 42 can be optionally changed. This enables an appropriate detachment or cutting operation when the holder 37 and the cutter 44 are each fitted into either of the first and second output gears 32 and 42. Thus, for example, in the case of disposing rotary work devices 1 symmetrically with respect to a production line, the rotary work devices 1 can be made symmetric only by exchanging the positions of the holder 37 and the cutter 44 in the first and second output gears 32 and 42 of one of the rotary work devices 1, thereby preventing an increase in cost. Furthermore, a holder 37 can be fitted into each of the first and second output gears 32 and 42, or a cutter 44 can be fitted into each of the first and second output gears 32 and 42, thereby providing great versatility. Moreover, since the single second intermediate gear 8 between the first and second output gears 32 and 42 rotates the first and second output gears 32 and 42 at the same time, the number of gears can be less than that of Japanese Patent No. 3650928, and a low-cost, compact rotary work device 1 can be obtained.

A region of the rotary work device 1 where an electrode 10 is partially cut away, a region thereof where an electrode 10 is detached from the shank S1, and a region thereof where an electrode 10 is fitted to the shank S1 are aligned. This alignment can simplify operation of, for example, a robot or an automatic machine moving an electrode 10 in the production line to reduce the takt time.

Furthermore, the servomotor 5 extends in a direction crossing the rotation axis C1 of the first output gear 32 and the rotation axis C2 of the second output gear 42. Thus, when the operation in which the electrode 10 is partially cut away and the operation in which the electrode 10 is detached from the shank S1 are performed, a portion of the robot or an automatic machine that brings the electrode 10 closer to the first and second output gears 32 and 42 along the respective rotation axes is less likely to be in contact with the rotary work device 1.

In addition, when the electrode 10 is to be detached from the distal end of the shank S1, cooling water dropping from the shank S1 is less likely to reach the inside of the servomotor 5 even if the cooling water enters the rotary work device 1. This can ensure that even when the operation in which the electrode 10 is detached from the shank S1 is repeated, a failure of the servomotor 5 is prevented.

The rotation of the first output gear 32 in the electrode detachment operation can be utilized to hold a target electrode 10 for being detached. This eliminates the need for preparing a driving source for rotating the first output gear 32 separately from the servomotor 5 to hold the electrode 10. A simple facility can be provided, and a low-cost, compact rotary work device 1 can be obtained.

The present invention is suitable for a rotary work device that rotates to cut a distal end surface of, for example, a spot welding electrode for use in an automobile production line away or to detach the electrode from a distal end of a shank.

What is claimed is:

1. A rotary work device, holding with a holder an electrode fitted to a distal end of a shank of a spot welding gun and simultaneously rotating the holder about a central axis of the electrode to perform an electrode detachment operation in which the electrode is detached from the distal end of the shank, or the rotary work device bringing a cutter into contact with a distal end surface of the electrode fitted to the distal end of the shank and rotating the cutter about the central axis of the electrode to perform an electrode cutting operation in which the distal end surface of the electrode is cut away, the device comprising:
   a pair of rotators comprising a first rotator and a second rotator, wherein one of the holder or the cutter is fitted into the first rotator, and the other of the holder or the cutter is fitted into the second rotator, and wherein the first and second rotators each have a respective outer periphery including a respective plurality of annularly arranged teeth, wherein the first rotator is rotatably drivable about a first rotation axis and the second rotator is rotatably drivable about a second rotation axis, and wherein the first rotator and the second rotator are arranged in parallel such that the first and second rotation axes are parallel;
   an actuator including an intermediate gear meshing with some of the teeth of each of the rotators, and the actuator including a servomotor rotating the intermediate gear; and
   a controller including a memory that is connected to the servomotor and that stores a first rotational speed and a different second rotational speed higher than the first rotational speed, wherein
   when the electrode detachment operation is performed using the rotator into which the holder is fitted, the controller outputs a detachment start signal to the servomotor to rotate both of the rotators at the first rotational speed, and when the electrode cutting operation is performed using the other one of the rotators, the controller outputs a cutting start signal to the servomotor to rotate both of the rotators at the second rotational speed;
   wherein a rotatably mounted electrode disc is provided that is configured to contain a plurality of unused electrodes such that a central axis of each of the unused electrodes extends parallel to the first and second rotation axes, and wherein an ejection location at which the spot welding gun is configured to pick up one of the unused electrodes from the disc is provided along a straight line connecting the first and second rotation axes.

2. The rotary work device of claim 1, wherein
the electrode disk is provided radially outward from one of the rotators.

3. The rotary work device of claim 1, wherein
the servomotor has a shaft having a rotation axis extending in a direction crossing the first and second rotation axes.

4. The rotary work device of claim 1, wherein
a rotation axis of a rotation shaft of the servomotor is above the rotators.

5. The rotary work device of claim 1, wherein
the holder includes
   an annular body that is rotatable under a condition where a rotation axis of the annular body corresponds to the rotation axis of the rotator into which the holder is fitted, and
   a plurality of pressing members uniformly spaced about the rotation axis of the annular body and each supported by a respective spindle extending in a direction identical to a direction of extension of the rotation axis of the annular body so as to be rotatable, wherein
the pressing members each have a projection projecting away from the rotation axis of the annular body,
an inner circumferential surface of the rotator into which the holder is fitted has a plurality of recesses into each of which a corresponding one of the projections is loosely fitted,
under a condition where the electrode is placed among the pressing members such that the central axis of the electrode corresponds to the rotation axis of the annular body, the rotator into which the holder is fitted is rotated about the rotation axis of the annular body in a direction of rotation relative to the holder,
the rotation relative to the holder of the rotator into which the holder is fitted allows an inner surface of each of the recesses to press a corresponding one of the projections,
the pressing members are thus rotated, and press an outer circumferential surface of the electrode to hold the electrode, and
the electrode is rotated together with the holder by further rotating the rotator, into which the holder is fitted, about the rotation axis of the rotator into which the holder is fitted in the said direction, and is detached from the distal end of the shank.

* * * * *